United States Patent [19]

Novoselsky

[11] Patent Number: 4,902,161
[45] Date of Patent: Feb. 20, 1990

[54] HERMAPHRODITE CONNECTOR FOR LAND AND SEAS AND AIR AND SPACE APPLICATIONS

[76] Inventor: Boris Novoselsky, 6601 110th St., Forest Hills, N.Y. 11375

[21] Appl. No.: 214,666

[22] Filed: Jul. 1, 1988

[51] Int. Cl.⁴ .............................................. B25G 3/18
[52] U.S. Cl. ...................................... 403/322; 403/330
[58] Field of Search .............................. 403/322, 330

[56] References Cited

U.S. PATENT DOCUMENTS 4,012,988  3/1977  Knight .............................. 403/322 X
4,597,689  7/1986  Mitchell et al. ....................... 403/322

*Primary Examiner*—Andrew V. Kundrat
*Attorney, Agent, or Firm*—Herbert Dubno

[57] ABSTRACT

A connector in the form of a support which can be mounted on or build onto one article which is to be connected to another article which can have an entirely identical connector adapted to be joined to the first, a connecting member on the support being swingable, and which has a tongue forming one end of the member and means defining a cavity at an opposite end, dimensioned to accommodate the tongue. An actuating mechanism is provided to pivot the connecting member between a first position in which the tongue is retracted into the support and a second position in which the tongue projects from the support generally perpendicular or transverse to the retracted position and can engage in the cavity of the connecting member of the other article when the latter is in its retracted position. The forces acting on the articles is taken up between the members by at least one locking member or guillotine inserted into engagement with a formation of the connecting member generally transverse to the latter and braced against two parts of the other article on opposite ends of the connecting member.

18 Claims, 4 Drawing Sheets

HERMAPHRODITE CONNECTOR FOR LAND AND SEAS AND AIR AND SPACE APPLICATIONS

FIELD OF THE INVENTION

My present invention relates to a connector for joining two articles or objects and, more particularly, to a connector adapted to mate with a corresponding connector of identical form to join two articles against strong forces tending to separate them. The invention has application in land, air, space and sea fields in which two relatively massive bodies must be releasably interconnected and whereupon alignment and the forces tending to separate the objects or putting strain upon the connectors can be substantial.

BACKGROUND OF THE INVENTION

The use of connectors for joining relatively massive bodies and which must be capable of taking up substantial forces or stress in a direction in which these bodies may tend to separate are well known in various fields.

For example, in land vehicles, it is known to couple cars of trains, tractors and trailers and, in general, a towing vehicle with a toed vehicle by a connector which involves the use of a male connecting member on one body or article and a female connecting member on another. The principal drawback of this connection approach is that not every end or side of each body can be connected to every end or side of another body because two male connectors or two female connectors cannot be joined.

In rail applications, for example, so-called hermaphrodite connectors have been proposed which allow one object to be joined to either end of another object because each connector can act either as a male connector or as a female connector or in a neuter manner, i.e. neither as a male nor as a female connector utilizing a pin or other element to ultimately form the junction.

Hermaphrodite connectors have found less application in other fields but are equally desirable.

The connectors with which the invention is concerned, can be used in these applications and in other applications such as space, where the connector can couple portions of space vehicles together to form a space station or platform, such as the sea in which the connectors can join portions of ships or barges together, and, indeed wherever high load connection is required.

One of the principal difficulties with earlier connectors is that they are incapable, if provided with suitable actuating appliances to take up substantial loads in directions tending to separate the bodies or articles which are to be coupled.

Accordingly in some connector applications, force takeup utilizing members which re collaterally brought into play has been required. Such members, which can engage over connecting elements, are frequently referred to as guillotine because they are customarily inserted in a direction transverse to the direction in which the coupling member extends and thus have an action similar to the blade of a guillotine.

Applicant is aware of the following U.S. Patents which relate to connectors:

| U.S. Pat. 399,532; | U.S. Pat. 346,559 |
| U.S. Pat. 488,586; | U.S. Pat. 485,500 |

In Applicant's view, these patents do not disclose or suggest a structure as recited by Applicant's, because they do not have tongue structures which cooperate in a truly hermaphrodite manner with actuators as described below. In U.S. Pat. No. 488,586, for example, the two coupling members appear to be complimentary but are not truly identical whereas in the system of U.S. Pat. No. 485,500, the swinging actuation of a tongue does not form the coupling structure.

OBJECTS OF THE INVENTION

It is, therefore, the principal object of the present invention to provide a connector which overcomes some or all of the drawbacks of earlier connectors as outlined above.

A more specific object of my invention is to provide a connector for large boxlike articles, in terrestrial or space application which can take up substantial forces tending to separate the articles and yet can be easily actuated, and particularly, is hermaphrodite in character, i.e. can couple to an identical connector.

SUMMARY OF THE INVENTION

These Objects and others which will become apparent hereinafter are attained in accordance with this invention by providing a connector in the form of a support which can be mounted on or built onto one of the articles connected to another article which can have an entirely identical connector adapted to be joined to the first.

According to the invention, therefore, on this support, a connecting member is swingable which has a tongue forming one end of this member and means defining a cavity at an opposite end, dimensioned to accommodate the tongue.

The actuating mechanism is provided to pivot the connecting member between a first position in which the tongue is retracted into the support and a second position in which the tongue projects from the support generally perpendicular or transverse to its first position and can engage in the cavity or connector of the other article when the latter is in its first position. In other words, the connecting member of the invention is a true hermaphrodite in that its tongue can engage in the cavity of a like member and another connector in one position whereas in its other position it can receive the tongue of the other connector.

According to the invention, moreover, the force is taken up between the members by at least one locking member or guillotine inserted into engagement with a formation of the tongue or blade generally transverse to the latter and braced against two parts of the other article on opposite sides of this tongue. Naturally, to relieve the actuating and pivoting mechanism of the connecting member from stress, the force can be taken up by two locking members or guillotines each braced against two parts of the respective article.

I have found, moreover, that two such connecting members can be provided with actuation by a single actuating rod and further, it is advantageous, especially when assembling a plurality of bodies in succession, to provide the engagement formation of the connecting member as a swivel or ball joint and to have the locking member formed by a rod or bar engaging in a hole in the tongue, e.g. via such a swivel or ball joint.

In this construction, while the tongue is at an inclined position, it can engage in the cavity of an article which is being lowered into position adjoining the first article, the locking member can be inserted and the swiveling can allow the tongue to assume its final position at a right angle to its retracted position only when the article is fully lowered whereupon a second connector can be brought into play to complete the attachment.

When a plurality of connecting tongues are provided for actuation by a single rod, they preferably are disposed one above another so that they can be locked by a common guillotine member.

In all of the above described embodiments of the invention, the connecting members are mounted on horizontal pivots for swinging movement in a vertical plane. In a further embodiment of the invention, the connecting members are mounted on a vertically disposed actuating rod pivotally mounted on a support for swinging movement of the connecting members in a horizontal plane.

According to an important feature of the invention, especially when the connector is used for the docking of spacecraft and the like, the actuator of the connector may be remotely controlled, generally via a computer operated actuator or effector.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
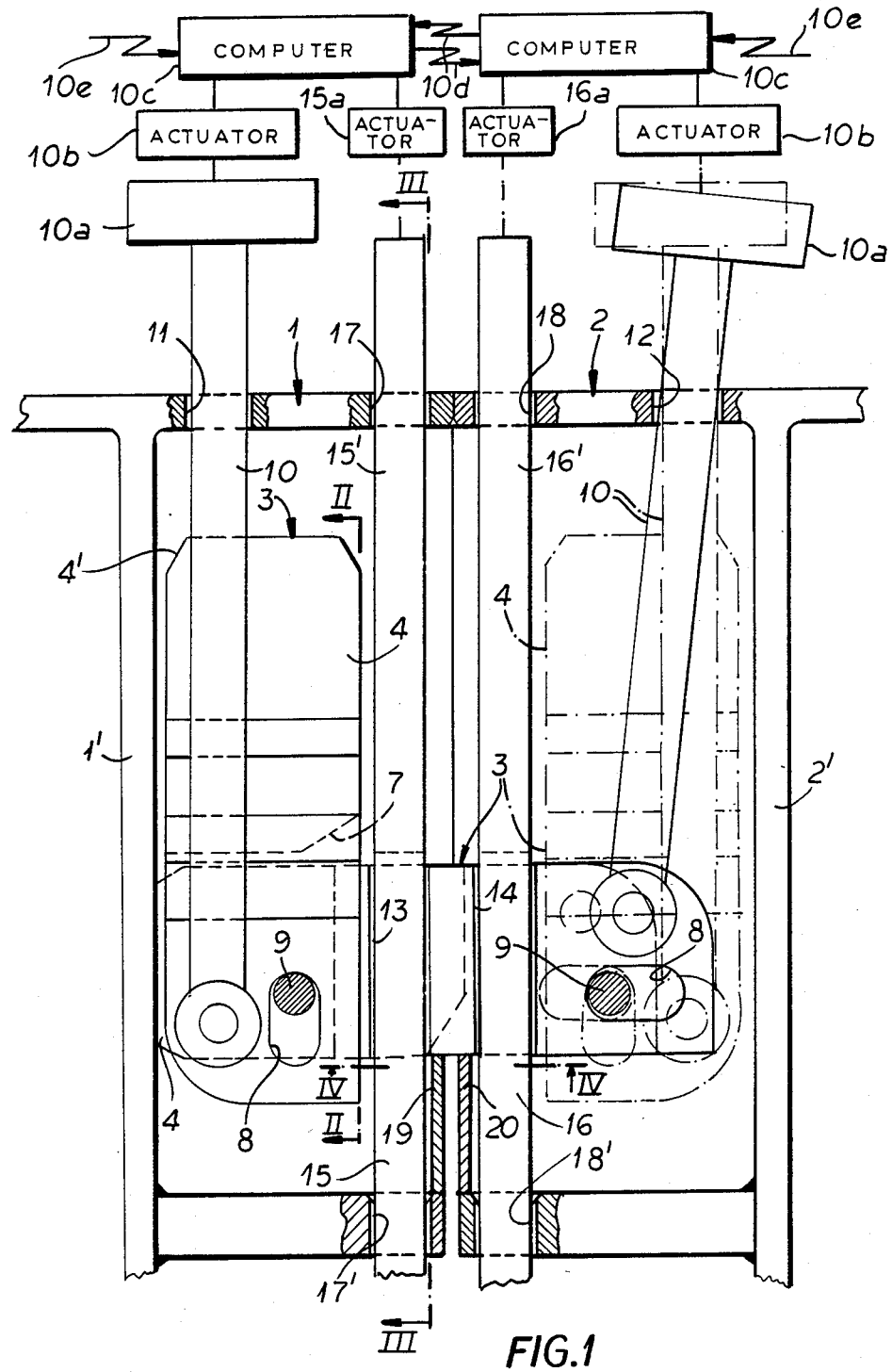
FIG. 1 is a side elevational view, with parts broken away, of a connector for two articles according to the invention.
Figure 2:
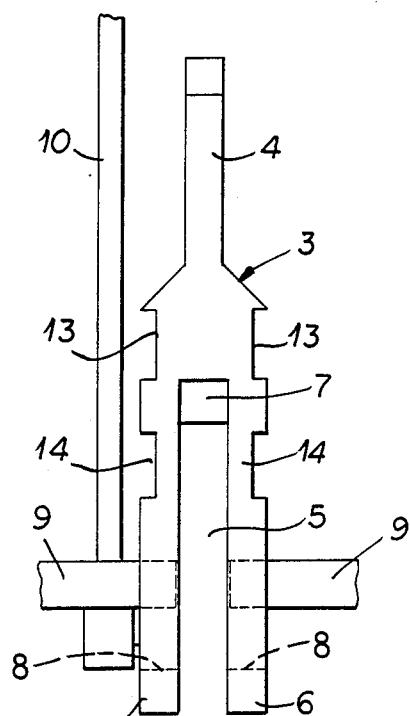
FIG. 2 is an elevational view taken along line II—II of FIG. 1.
Figure 3:
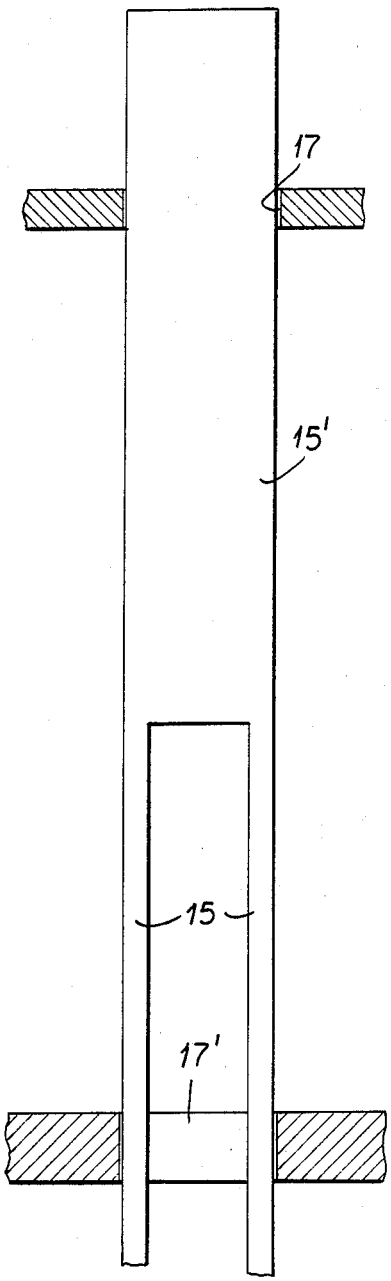
FIG. 3 is a sectional view taken along line III—III of FIG. 1.

In FIGS. 1-4 there is shown a first embodiment of a connector for a pair of articles each having a respective support 1 and 2 in which there are pivotally mounted respective connecting members 3. The connecting members 3 are formed with a tongue portion 4 at one end and a cavity portion 5 at the other end defined by shanks 6, the cavity 5 being dimensioned to accommodate the tongue 4 and is open at one end and formed at a closed end with a beveled mouth 7 which cooperates with bevels 4' formed on tongue portions 4. The shanks 6 are formed with elongated slots 8 which receive pins 9 extending horizontally from the respective support and about which the connecting members 3 can swing in a vertical plane, operable by actuating rods 10 pivotally connected with the shanks 6 at a point offset from the pins 9, the rods 10 extending upwardly through openings 11 and 12 in respective supports 1 and 2.

The shanks 6 are provided with engagement formations in the form of respective grooves 13 and 14 extending transverse to the longitudinal direction of the connecting members 3 and are adapted to receive respective legs 15 and 16 of respective upright locking members 15' and 16', the legs being adapted to flank the connecting members, the locking member 15' extending through openings 17 and 17' formed in support 1 and engaging grooves 13, and the locking member 16' extending through openings 18 and 18' in support 2 and engaging grooves 14.

Figure 5:
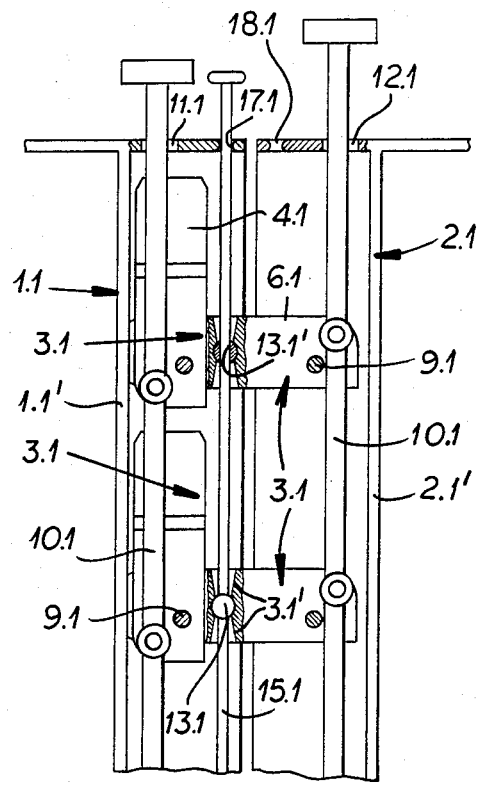
FIG. 5 is a side elevational view, with parts broken away, of another of the invention.
Figure 4:
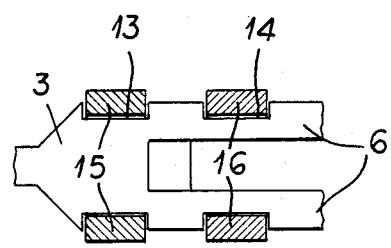
FIG. 4 is a sectional view taken along line IV—IV of FIG. 1.

In the embodiment of the invention illustrated in FIG. 5, a plurality of connecting members 3.1 substantially identical to connecting members 3, are provided in respective supports 1.1 and 2.1 and are pivotally mounted therein, one above the other, on pivots 9.1 and are operable by actuating rods 10.1 pivotally connected with the shanks 6.1 at a point offset from the pins 9.1 of each connecting member in vertical alignment, the rods 10.1 extending upwardly through openings 11.1 and 12.1 in respective supports 1.1 and 2.1.

Each connecting member 3.1 is provided with an engagement formation in the form of a ball joint 13.1 having an axial bore 13.1' traversed by a locking member 15.1 in the form of an upright rod, each ball joint 13.1 being axially flanked by conical passageways 3.1' formed in the respective connecting members, the locking members 15.1 extending through openings 17.1 and 18.1 formed in respective supports 1.1 and 2.1.

Figure 6:
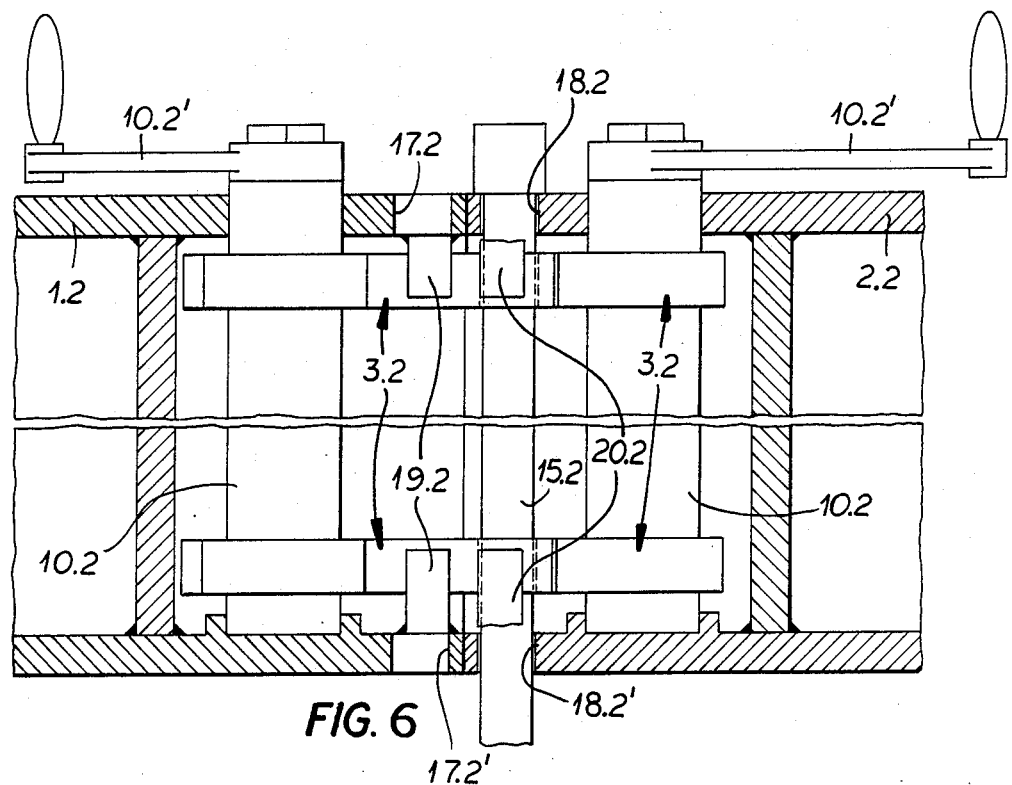
FIG. 6 is side elevational view, partially in section, of still a embodiment of the invention.
Figure 7:
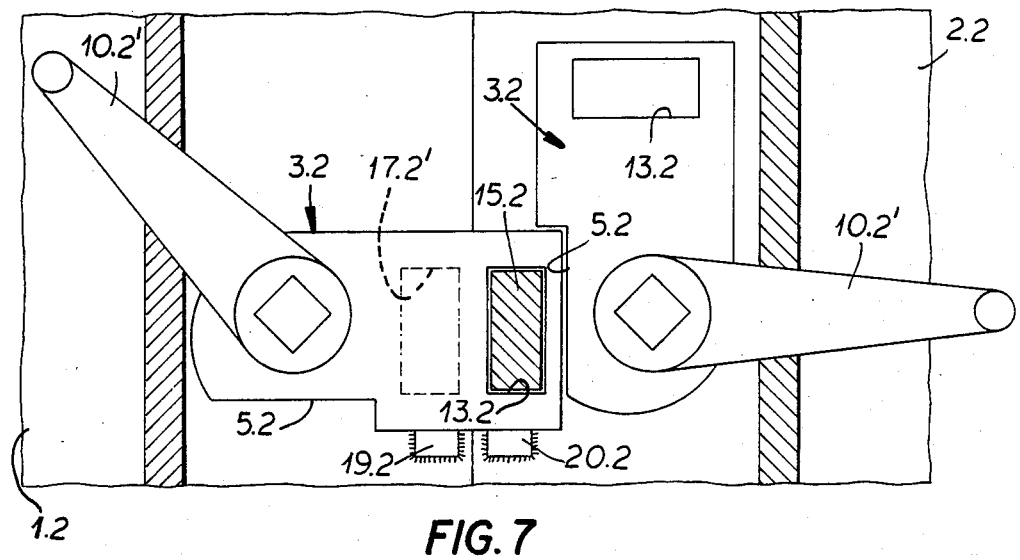
FIG. 7 is a top plan view of FIG. 6 with parts broken away for clarity.

In the embodiment of the invention illustrated in FIGS. 6 and 7, a pair of connecting members 3.2 are provided in each support 1.2 and 2.2 and are pivotally mounted therein on respective actuating members in the form of vertically disposed shafts 10.2 rotatable by respective cranks 10.2', to swing the respective pairs of connecting members 3.2 in a horizontal plane, the respective pairs of connecting members being mounted on a respective shaft in alignment and parallel to one another. Each connecting member 3.2 has a tongue portion formed with an opening 13.2 which can be traversed by a locking member 15.2 in the form of a vertical blade or bar extending through openings 17.2 and 17.2' in support 1.2, or openings 18.2 and 18.2' in support 2.2. The connecting members 3.2 are each further formed with a cavity defined by a respective notch 3.2 are each further formed with a cavity defined by a respective notch 5.2 adapted to receive an end of a tongue portion of the cooperating connecting member.

In the operation of the embodiment shown in FIGS. 1-4, the connecting members 3 are normally retained in an upright position within the confines of respective supports 1 and 2. When it is wished to join the pair of articles together, either one of the connecting members 3 is lowered, by drawing upwardly on the associated actuating rod 10, into a horizontal position resting on a respective stop 19 or 20 of the respective support 1 or 2 and extending throbbing. The articles are then brought together moving horizontally, with the respective tongue portion 4 of the horizontal connecting member extending into the cavity 5 of the other connecting member remaining in an upright position, the bevels 4' and 7 acting to guide the tongue into the cavity, until the supports 1 and 2 abut one another. At that point, the horizontal connecting members is slid forward within the range of the slots 8 by the actuating rod 10 which can tilt within the opening 12 until the free end of the tongue 4 abuts the respective endwall 1' or 2' of a respective support 1 or 2, which brings the grooves 13 and 14 into alignment with respective openings 17, 17' and 18, 18' or vice versa, depending upon which connecting member of supports 1 and 2 is in the horizontal position.

As shown inn FIG. 1, by way of example, the connecting member 3 of support 2 is in the horizontal position, with the grooves and openings in alignment which allows the locking member 15' to be inserted through the upper opening 17, grooves 13, and lower opening 17' of support 1, which acts to lock the connecting member 3 of support 2 in place, thereby joining the articles together by their supports 1 and 2. To relieve the strain on the locking member 15', a second locking member 16' can be employed, which is inserted through the upper opening 18, grooves 14, and lower opening 8' of support 2, but is not necessary for joining the articles. In addition, it should be understood that the operation for joining the articles as described is exactly the same regardless of which connecting member is in the horizontal position.

As can be seen from FIG. 1, the members 10 of the 2 vessels or vehicles can be operated by hand via handles 10a.

Alternatively, and when the members 10 form part of the connector system of a space vehicle to facilitate docking to a satellite or another space vehicle, members 10 can be provided with respective actuators 10b controlled by onboard computers 10c which can also operate corresponding actuators 15a and 16a of the guillotine locking members on the respective vehicles.

The computers 10c of the 2 vehicles, of course, can be linked to coordinate with one another by a radio frequency link 10d and can communicate via the respective vehicle transmission links 10c with ground stations.

The operation of the embodiment of FIG. 5 is similar to that of FIG. 1 and again merely by way of example, the connecting members 3.1 of support 2.1 are lowered into a substantially horizontal position with the tongue 4.1 projecting beyond the support 2.1. However, in this embodiment for ease of handling of the articles to be joined, the support 2.1 can be slightly tilted with respect to the support 1.1, so that the connecting members are also slightly tilted below the horizontal when the tongues thereof enter the cavities of the connecting members of the support 1.1. At this point, before the free ends of the tongues 4.1 abut the respective endwalls 1.1' or 2.1' of respective supports 1.1 or 2.1, the locking member 15.1 continues to be inserted through the successive ball joints guided by the conical passageways 3.1' and as the support 2.1 continues to move toward the support 1.1, the tilt angle becomes less and less, this being enabled by the ball joints swiveling until the connecting members are completely horizontal with the free ends of the tongues 4.1 abutting the endwall 1.1, the lower end of the locking member 15.1 being engaged in a lower opening of the support 1.1 which is not shown.

Once again, it should be pointed out for this embodiment of the invention that the operation for joining the articles as described is exactly the same regardless of which connecting members are in the horizontal position, so that if the connecting members of support 1.1 are in the horizontal position, it is this support which will be tilted and the locking member 15.1 will be inserted through the opening 18.1 of support 2.1 and it is the endwall 2.1' which the connecting members will come to rest against. Furthermore, in this embodiment when the connecting members 3.1 come to rest on an endwall, the supports 1.1 and 2.1 are slightly spaced from one another, so there is always a certain amount of flexibility between the joined articles.

In the operation of the embodiment of the invention shown in FIGS. 6 and 7, once again merely by way of example, the connecting members 3.2 of support 1.2 are rotated in a horizontal plane by the crank 10.2' acting on the shaft 10.2 into contact with stops 19.2, in which position the tongue portion of the connecting member extends beyond the support 1.2, while the connecting members 3.2 of support 2.2 remain within the confines thereof substantially at right angles to the connecting members of support 1.2. The supports 1.2 and 2.2 are then moved together into contact with one another, with the tongue portions of the connecting members of support 1.2 interfitting in the notches 5.2 of connecting members 3.2 of support 2.2, which acts to position the openings 13.2 of the extended connecting members in alignment with the openings 18.2 and 18.2' of support 2.2, whereby the locking member 15.2 can traverse these aligned openings, joining the articles together.

Once again, it is pointed out that for this embodiment of the invention, the operation for joining the articles as described is exactly the same regardless of which connecting members are in the extended position, so that if the connecting members 3.2 of support 2.2 are in the extended position in contact with stops 20.2, they will be interfitted in notches 5.2 of the connecting members of support 1.2, positioning the openings 13.2 in alignment with the openings 17.2 and 17.2' of support 1.2 and then traversed by locking member 15.2.

I claim:

1. A connector system for a first article and a second article formed respectively with a first and a second connector, each of said connectors comprising:
   a support formed on the respective one of said articles;
   a respective connecting member having a tongue and a cavity at opposite ends of said connecting member and swingably mounted on the respective support for displacement between a first position wherein said tongue is retracted toward the respective one of said articles and said cavity is open toward the other of said articles to receive a tongue of the connector thereof, and a second position wherein said tongue of said connecting member projects beyond said support and is positioned to engage in the cavity of the connector of the other of said articles;
   an actuating rod operatively connected to said connecting member and actuatable on said one of said articles for displacing said connecting member between said positions, said connecting member being provided with at least one engaging formation; and
   a locking member engaging said formation and adapted to brace against said other article at at least two locations straddling said connecting member for retaining said other article locked to said one of said articles until said locking member is withdrawn from engagement with said formation.

2. The connector system defined in claim 1 wherein said formation includes a swivel member engaged by said locking member and enabling angular offset of said articles.

3. The connector system defined in claim 1 wherein said formation includes a hole formed in said connecting member, said locking member being a bar traversing said hole.

4. The connector system defined in claim 1 wherein said connecting member is formed with two of said formations, said connector further comprising a second locking member substantially parallel to the first-mentioned locking member, engaging one of said formations and braced against two locations on said support straddling said connecting member.

5. The connector system defined in claim 4 wherein said formations are pairs of grooves formed in said connecting member and engageable by guillotine bars forming said locking members.

6. The connector system defined in claim 1 wherein said actuating rod is articulated to said connecting member at a pivot point offset from an axis at which said connecting member is swingably mounted on said support.

7. The connector system defined in claim 6 wherein said tongue has a free end engageable in a cavity of the connecting member of the other article which is tapered and each cavity has an inwardly tapered mouth for self-aligning engagement of each tongue in a respective cavity.

8. The connector system defined in claim 7 wherein said cavity of said connecting member of said one of said articles is downwardly open in said first position and is defined between two shanks spaced apart by a distance greater than the width of said tongue.

9. The connector system defined in claim 8 wherein said shanks are provided with slots extending parallel to said tongue and receiving respective pivot pins of a respective support defining said axis and enabling shifting of said connecting member along said slots relative to said axis.

10. The connector system defined in claim 9 wherein said formation includes a swivel member engaged by said locking member and enabling angular offset of said articles.

11. The connector system defined in claim 9 wherein said formation includes a hole formed in said tongue, said locking member having a bar traversing said hole.

12. The connector system defined in claim 9 wherein said connecting member is formed with two of said formations said connecting member further comprising a second locking member substantially parallel to the first-mentioned locking member, engaging one of said formations and braced against two locations on said support straddling said tongue.

13. The connector system defined in claim 12 wherein said formations are pairs of grooves formed in said shanks and engageable by guillotine bars forming said locking members.

14. The connector system defined in claim 1 wherein a plurality of such connecting members are swingably mounted in spaced apart relation on said support for engagement with a corresponding number of connecting members on said other article, said rod being operatively connected to all of said connecting members on said support for jointly swinging same between said positions.

15. The connector system in claim 1 wherein said actuating rod is pivotally mounted on said support centered on an upright axis for displacing said connecting member in a horizontal plane, said actuating rod being operable by a crank engaging a free end thereof.

16. The connector system in claim 15 wherein a plurality of such connecting members are swingably mounted in spaced apart relation on said support for engagement with a corresponding number of connecting members on said other article, said actuating rod being operatively connected to all of said connecting members on said support for jointly swinging same between said positions.

17. The connector defined in claim 1, further comprising automatic actuator means on each of said articles for displacing the respective actuating rod and locking members.

18. The connector defined in claim 1 wherein said automatic actuating means including a computer.

* * * * *